No. 626,038. Patented May 30, 1899.
P. J. RILEY.
MECHANICAL MOVEMENT.
(Application filed Sept. 14, 1898.)
(No Model.)
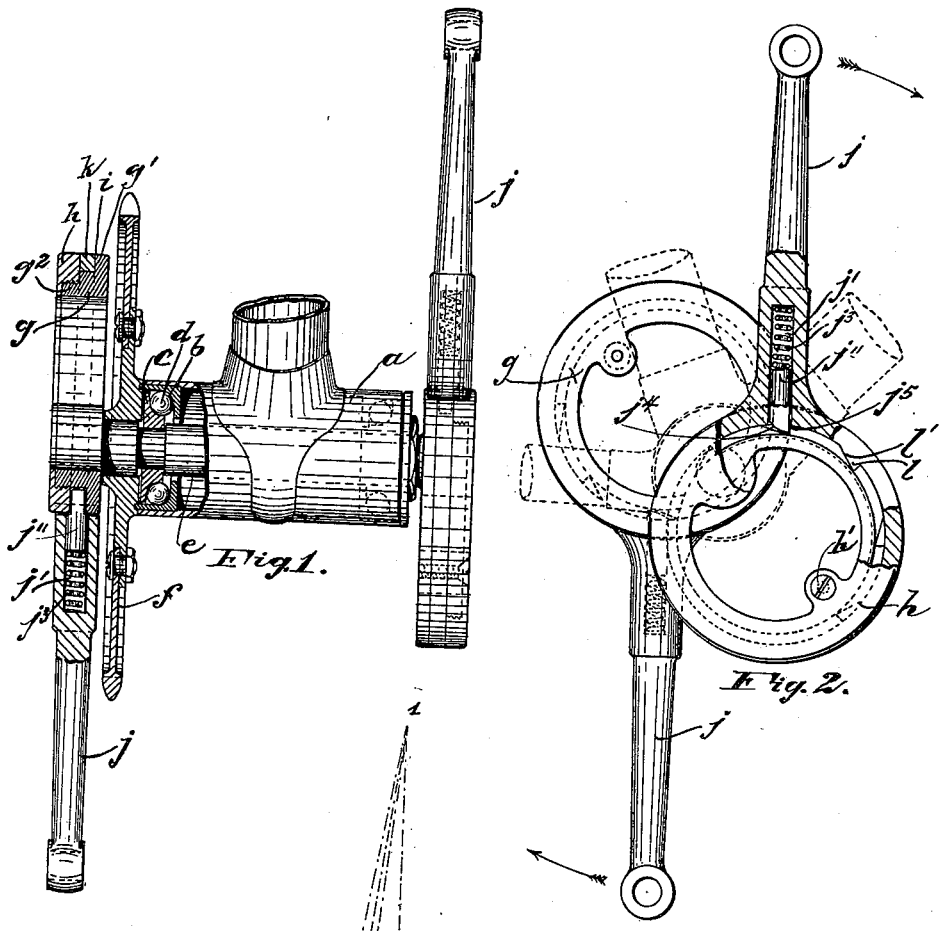
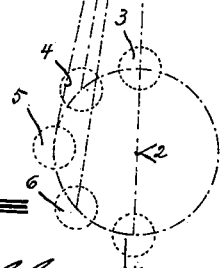
WITNESSES:
INVENTOR
Peter John Riley
BY
Gartner & Leevand
ATTORNEYS
THE NORRIS PETERS CO., PHOTO-LITHO., WASHINGTON, D. C.

UNITED STATES PATENT OFFICE.

PETER JOHN RILEY, OF WEATHERLY, PENNSYLVANIA, ASSIGNOR OF ONE-HALF TO JEROME COMSTOCK READ, OF PATERSON, NEW JERSEY, AND JAMES WALTER LOVATT, OF BETHLEHEM, PENNSYLVANIA.

MECHANICAL MOVEMENT.

SPECIFICATION forming part of Letters Patent No. 626,038, dated May 30, 1899.

Application filed September 14, 1898. Serial No. 690,915. (No model.)

*To all whom it may concern:*

Be it known that I, PETER JOHN RILEY, a citizen of the United States, residing in Weatherly, in the county of Carbon and State of Pennsylvania, have invented new and useful Improvements in Mechanical Movements; and I do hereby declare the following to be a full, clear, and exact description of the invention, such as will enable others skilled in the art to which it appertains to make and use the same, reference being had to the accompanying drawings, and to letters and numerals of reference marked thereon, which form a part of this specification.

My invention relates to mechanical movements; and the object of my invention is to provide simple and effective means for altering at will the distance between the point at which power is applied to a crank and the center of rotation thereof and of a shaft to which it is adapted to transmit motion.

I have shown and will hereinafter describe my invention as applied to a bicycle crank and shaft; but it is obvious that it is adapted to be used in any other mechanical application where it is desired or necessary to vary the distance between the power-point of a crank and its center of rotation, and consequently the leverage.

My invention consists in the combination of the shaft or other element to be rotated, a crank carried on said shaft, and means for so connecting the crank to said shaft as to produce the above-mentioned desired result, and also in the combination and arrangement of the various parts, substantially as will be hereinafter fully described and claimed.

In the accompanying drawings, Figure 1 is a view in elevation of a bicycle crank-hanger carrying a shaft and cranks provided with my improvement, some of the parts being shown in elevation and some in section. Fig. 2 is a view in side elevation of my invention, parts of the same being broken away or in section; and Fig. 3 is a diagrammatic view showing various positions which the crank by means of my invention may be made to assume relatively to the shaft upon which it is mounted.

In the accompanying drawings the letter $a$ indicates a crank-hanger, in and at each end of which there are mounted the usual ball-race $b$ and cone $c$, providing bearings for balls $d$, arranged between them. Said cones are mounted upon and revoluble with a shaft $e$, which penetrates the crank-hanger. Said shaft $e$ carries near one end thereof the usual sprocket-wheel $f$. Secured at each end of the shaft in any desired manner is an eccentric $g$, provided near its inner edge with a flange $g'$ and upon its outer face with a threaded annulus $g''$. It will be seen that the flange $g'$, the threaded annulus $g^2$, and the intermediate portion of the eccentric constitute three integral annuli of graduated diameters and that when a cap, as $h$, of a diameter approximating that of the larger annulus, is screwed onto the smaller or threaded annulus it forms with the other two annuli a channel $i$. The cap when in place is adapted to be securely held from unscrewing by means of a screw $h'$, penetrating said cap and extending into the eccentric. By the construction just described the arrangement of the cap $h$ upon the eccentric is positive, owing both to the fact that it is screwed upon the eccentric and in its normal or operative position up against the intermediate annulus, and consequently there can be no looseness of parts. Moreover, the parts can be readily disassembled for cleaning, oiling, and other similar purposes.

$j$ indicates the cranks, and $k$ indicates an integral band at the inner end of each of them, which surrounds the eccentric and works in the annular channel $i$. At their inner ends each of said cranks is provided with a longitudinal socket $j'$, in which works a pawl $j''$, normally held with its free end projecting out of said socket by means of a spiral spring $j^3$, disposed between the bottom of the latter and the pawl. The free end of said pawl is provided with one inclined edge $j^4$, which is adapted to wipe upon correspondingly-inclined edges $l'$ of recesses $l$, arranged at various desirable points on the periphery of the eccentric, the other edges of said recesses being radially arranged and adapted to be engaged by the straight-edge $j^5$ of the pawl. The arrangement of the crank relatively to the eccentric is such, therefore, that when the latter is being rotated in a forward direction by the former the engagement between these two elements is positive; but when one is being rotated in a direction relatively opposite to that of the other the pawl will automatically release said elements. Hence it is obvious that since the crank is mounted upon an eccentric that is carried by the shaft and is adjustable on said eccentric the distance between its power-point and its center of rotation may be varied by simply rotating said crank on and to a desired position relatively to said eccentric.

From the foregoing it will be seen that I have provided an arrangement by which the length of the crank is rendered practically variable and which when the crank is in the vertical position so places it forward (or backward) of the dead-center of the ordinary crank as to permit the rider to apply force thereto at an angle and not longitudinally of the same. It is apparent that if the rider back-pedals with a sufficient application of power to overcome the force of the spring $j'$ the pawl will be disengaged from one of the notches, thus permitting the eccentric to rotate independently thereof, so that the crank may be set in a new position thereon. The tensile power of the spring may be, of course, varied to suit different riders.

In the diagrammatic view, 1 indicates the point of application of power upon the crank, 2 indicates the center of the eccentric, and 3, 4, 5, 6, and 7 indicate points equidistantly arranged in a semicircle described about the point 2 and representing the position of the shaft from which the crank is lengthened. Therefore, assuming that the crank is a six-inch crank and that the throw of the eccentric is two and one-half inches in the positions 3, 4, 5, 6, and 7, respectively, the practical length of the crank will be approximately as follows: six and seven-sixteenths, seven and five-sixteenths, eight and three-sixteenths, and eight and one-half inches.

It will be observed upon reference to the drawings that the band $k$ is of less thickness than the crank $j$, of which it forms a part, and that the inner end of the latter, both sides of the band, is in approximate contact with the flange $g'$ and the cap $h$ of the eccentric. By this arrangement said inner end of the crank practically bears upon the above-mentioned parts of the eccentric, and thus undue lateral bending and a possible fracture of the part comprising the crank and band at the junction of these two elements and due to the abrupt reduction of the thickness of said part at this point are obviated.

Having thus fully described my invention, what I claim as new, and desire to secure by Letters Patent, is—

The combination of a shaft having suitable bearings, an eccentric carried thereby at each of its ends and consisting of three integral annuli of graduated diameters, the smallest one of said annuli being peripherally screw-threaded and the intermediate annulus having peripheral notches, a cap screwed on said annulus, said cap and the largest annulus approximating in diameter and forming with the intermediate annulus a channel, a crank provided with a band of less thickness than said crank and surrounding, and movable about, said eccentric, said band being disposed between said cap and the largest annulus and the inner end of the crank being in approximate contact with said largest annulus and the cap, and a spring-actuated longitudinally-movable pawl carried by said crank, radially arranged therein with respect to said eccentric, and being adapted to engage said notches, substantially as described.

In testimony that I claim the foregoing I have hereunto set my hand this 6th day of September, 1898.

PETER JOHN RILEY.

Witnesses:
G. MALÉ,
JAS. B. NEWTON.